March 26, 1946.  T. H. TROLLER ET AL  2,397,171
FAN AND MOTOR MOUNTING
Filed Dec. 6, 1943   2 Sheets-Sheet 1
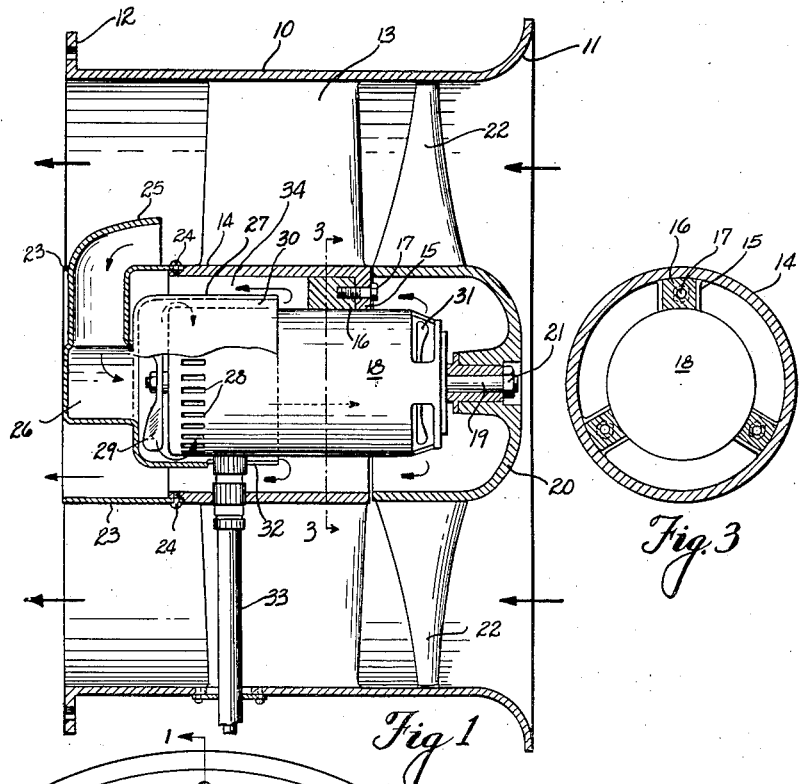
Fig. 1
Fig. 3
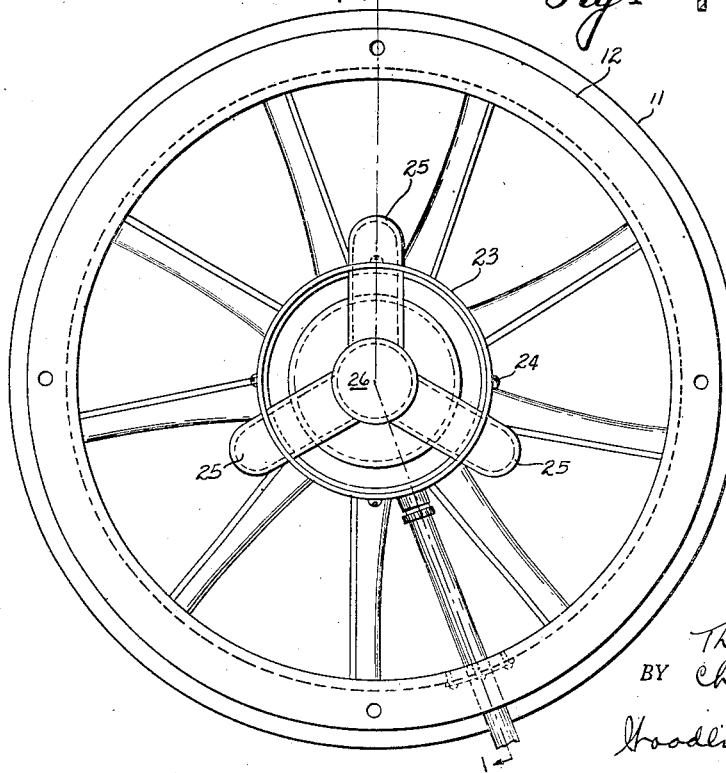
Fig. 2
INVENTORS
Theodor H. Troller
BY Chester P. Jenkins
Woodling and Krost attys

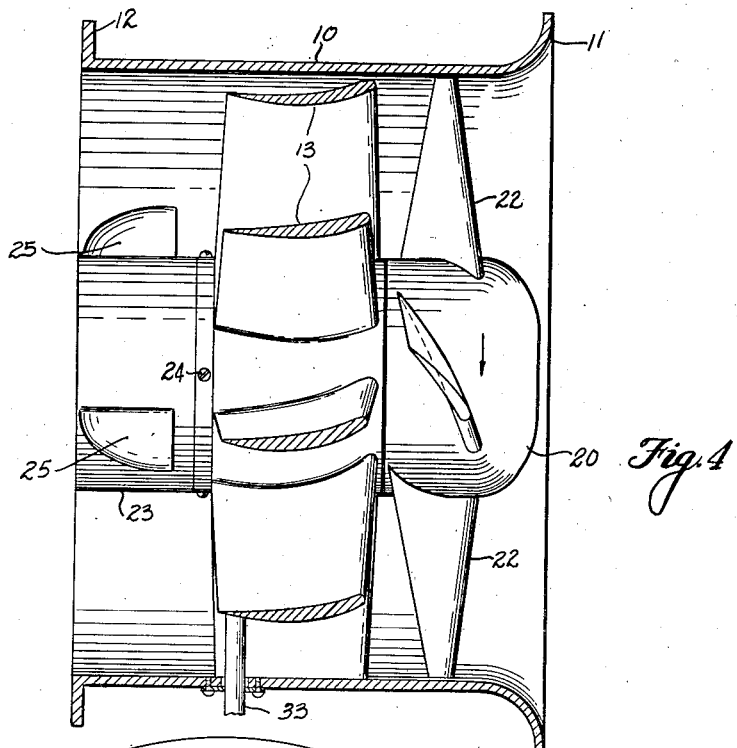
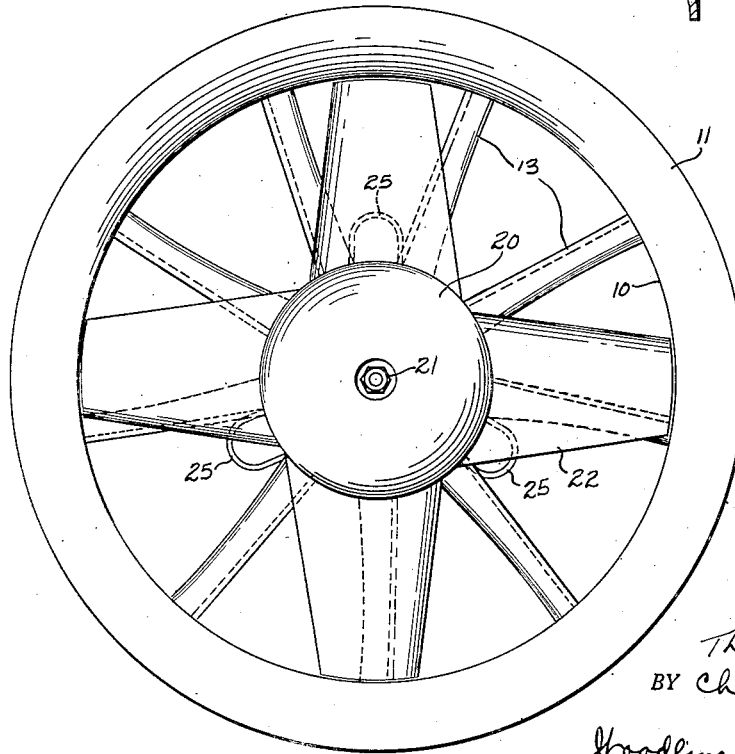

Patented Mar. 26, 1946

2,397,171

UNITED STATES PATENT OFFICE 2,397,171

FAN AND MOTOR MOUNTING

Theodor H. Troller and Chester P. Jenkins, New Philadelphia, Ohio, assignors to La-Del Conveyor & Manufacturing Company, a corporation of Ohio Application December 6, 1943, Serial No. 513,170

14 Claims. (Cl. 230—117)

The invention relates in general to a fan and motor housing and more particularly to a fan and motor housing for an axial flow fan.

In an axial flow fan where high pressure and low volume is required, the hub of the fan is made relatively large. The motor required to drive the fan is smaller in diameter than the hub of the fan.

In the construction of electric motors, there are certain design requirements and proportions of parts which must be maintained in order to produce an economical product. Thus, the diameter bears a certain ratio to the length of the motor for efficient design. In this invention, the motors are selected as they are built by motor manufacturers and the housing of the present invention is built around the motor to obtain the best air flow requirements.

An object of the invention is the provision of a fan and motor housing in which the motor and fan may be readily mounted and aligned within the housing.

Another object of the invention is the provision of a motor supporting structure which, with a minimum of material, provides a fitting for a motor of the best design on the basis of electrical requirements to a fan rotor of the best design on the basis of air flow requirements.

Another object of the invention is the provision of cooling the motor by splitting off the air from the main stream of air and conducting the split off air to the motor.

Another object of the invention is the provision of mounting the motor within a shell which is carried by stationary vanes connected to the outer main air duct housing, together with the provision of mounting a duct arrangement on the shell for directing air to the motor to cool same, whereby the duct arrangement is mounted entirely separate from the motor.

Another object of the invention is the provision of a fan and motor housing in which the motor and fan are so mounted and aligned within the housing that the tip clearance between the fan and the housing may be maintained at a close minimum and in which the motor is aligned within a cooling duct arrangement which is carried by a shell that surrounds the motor and to which shell the motor is mounted and aligned therein.

Another object of the invention is the provision of a fan mounted in the duct system and driven by the motor to circulate air in contact with the motor.

Another object of the invention is the provision of a fan upon each end of the motor to give good distribution of the air for cooling the motor.

Another object of the invention is the provision of air duct means which is positioned in the path of the main fan driven air for directing air through a duct system to cool the motor.

Other objects and a fuller understanding of the invention may be had by referring to the following description and claims, taken in conjunction with the accompanying drawings, in which:

Figure 1 is a cross-sectional view of a fan and motor housing embodying the features of the invention, the section being taken along the line 1—1 of Figure 2;

Figure 2 is a rear view of the device shown in Figure 1;

Figure 3 is a cross-sectional view taken along the line 3—3 of Figure 1, with the internal parts of the motor being omitted;

Figure 4 is a cross-sectional view of the outside main air duct with the other parts shown in a side elevational view; and Figure 5 is a front view of the device shown in Figures 1 and 4.

With reference to the drawings, the fan and motor housing comprises a cast structure having an outer annular wall 10 and a centrally disposed hollow shell 14 connected to the outer annular wall 10 by a plurality of vanes 13. The forward end of the outer annular wall 10 is provided with an outwardly flared portion 11 to receive the incoming air. The rear end of the outer annular wall 10 may be provided with a connecting flange 12 whereby the housing may be suitably fastened to other conducting ducts which are not shown. The hollow shell 14 is provided with an inwardly projecting abutment means which comprises, as illustrated in the drawings, three bosses 15 which may have their inner ends machined to closely receive the outside casing of the motor 18 which is arranged to drive the main fan 22. As illustrated in Figures 1 and 3, the motor 18 is provided with an outwardly projecting mounting means which, as shown in the drawings, comprises three lugs 16 which abut against the bosses 15. The outer ends of the lugs 16 and the face which engages the bosses 15 may be machined to give a perfect mounting of the motor 18 and to keep the tip clearance of the fan blades to a close minimum. The motor 18 may be securely mounted in position by means of cap screws 17 which draw the lugs 16 closely against the bosses 15.

The fan 22 has a nose-like fan hub 20 which is arranged to be connected to the shaft 19 of the motor. The fan may be secured to the shaft 19 by means of a nut 21. The outside surface of the nose-like fan hub 20 substantially coincides with the outside surface of the hollow shell 14, so as to give a smooth flow to the fan driven air.

To aid in cooling the motor, a portion of the main fan driven air is split off and directed through a duct arrangement to the motor for cooling same. As illustrated, the duct arrangement comprises generally an extension shell 23, a plurality of intake air ducts 25, and a cup 27. In this invention, the extension shell 23, the intake air duct 25, and the cup 27 may be preferably cast in one piece and directly carried by the rear end of the hollow shell 14. The complete duct assembly may be connected to the rear end of the hollow shell 14 by means of the screws 24. While it is preferable to cast the extension shell 23, the intake air duct 25 and the cup 27 in one piece, it is to be understood that the several parts may be made individually and subsequently assembled or fabricated in any suitable manner. As illustrated in the drawings, there are three intake air ducts 25, although there may be any other number, and these ducts extend outwardly from the hollow shell 14 and are in the path of the main air driven fan to divert some of the main air driven fan to the motor for cooling same. Each of the intake air ducts 25 terminates in a central air duct 26 which directly communicates with the left-hand end of the cup 27. As illustrated in Figure 1, a fan 29 which is driven by the motor is mounted between the left-hand end of the cup 27 and the rear end of the motor. The inside dimension of the cup 27 is greater than the outside dimension of the motor 18 so that an annular air duct 30 is provided between the motor and the annular shell portion of the cup which surrounds the motor. The air which is split off from the main fan driven air stream first passes through the intake air ducts 25 to the central air duct 26 and from there the air passes into the cup 27 where it is driven by the fan 29 through the annular air duct 30, after which the air then flows back through the annular air passage 34 which leads to atmosphere through the hollow shell 14 and the extension shell 23. The air which passes through the annular air duct 30 between the outside of the motor 18 and the inside of the cup 27 aids in cooling the motor. As a further aid in cooling the motor, the air is passed through the internal parts of the motor. To this end, a plurality of openings 28 are provided in the rear end of the motor so that air upon leaving the cup compartment in which the fan 29 is mounted, may pass through the openings 28 to the internal parts of the motor. The forward end of the motor is provided with a plurality of openings through which the air inside of the motor may pass to the annular air passage 34 between the motor and the hollow shell 14. A fan 31 may be employed in the forward end of the motor to aid in drawing the air through the internal parts of the motor and to expel the air out through the opening in the forward end of the motor, after which the expelled air passes through the annular air passage 34 to atmosphere. The right-hand end of the annular air passage 34 is blanked by the nose-like hub 20 of the fan 22 and the left-hand end of the annular air passage 34 is open to atmosphere through the extension shell 23.

It is to be observed that the mounting of the motor is such that the tip clearance of the fan 22 may be maintained to a low minimum and such that the motor is entirely free of air duct attachment for directing air in contact with the motor for cooling same. A conduit 33 which carries the electric cable for energizing the motor passes through the outer annular wall 10 and the hollow shell 14. The cup 27 may be provided with a slot 32 so as to clear the conduit 33 and enable the cup to be slid on and off of the motor 18 during assembly and disassembly of the air duct arrangement.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to axially align the motor shaft and the fan within the outer annular wall.

2. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor.

3. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell.

4. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct.

5. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct, said shield terminating in the annular air passage between the motor and the internal surface of the said shell.

6. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct, said cup means having an auxiliary fan mounted therein to drive air through the annular air duct.

7. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct, said cup means having an auxiliary fan mounted therein to drive air through the annular air duct, said motor having an entrance opening through which the air from the cup means may flow into the internal parts of the motor.

8. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct, said cup means having an auxiliary fan mounted therein to drive air through the annular air duct, said motor having an entrance opening through which the air from the cup means may flow into the internal parts of the motor, said motor also having an exit opening through which air within the motor may flow into the annular air passage.

9. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means to direct air through the annular air passage to cool the motor, said last-mentioned means including air duct means extending outwardly from the shell and positioned to receive fan-driven air passing between the outer annular wall and said shell, said air duct means including cup means having an annular shield surrounding the motor and forming therewith an annular air duct, said cup means having a first auxiliary fan mounted therein to drive air through the annular air duct, said motor having an entrance opening through which the air from the cup means may flow into the internal parts of the motor, said motor also having an exit opening through which air within the motor may flow into the annular air passage, and a second auxiliary fan mounted in the motor to drive the air out through said exit opening.

10. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an external surface substantially coinciding with the external surface of the nose-like hub of the fan and having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, and means means to direct air through the annular air passage to cool the motor, said annular air passage having one end thereof blanked by the nose-like hub and having the other end thereof open to atmosphere.

11. In combination, a motor having outwardly projecting mounting means extending therefrom, a hollow shell receiving the motor and having inwardly projecting abutment means against which the outwardly projecting mounting means of the motor abuts, said shell having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means to the shell for clamping the radially overlapping abutting surfaces together to hold the motor at a spaced inward distance from the internal surface of the shell to provide said annular passage, a fan mounted on one end of the motor, said fan having a nose-like hub with an outer surface substantially coinciding with the outer surface of the shell, said annular air passage having one end thereof blanked by the nose-like hub and having the other end open to atmosphere.

12. In combination, a motor having outwardly projecting mounting means extending therefrom, a hollow shell receiving the motor and having inwardly projecting abutment means against which the outwardly projecting mounting means of the motor abuts, said shell having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means to the shell for clamping the radially overlapping abutting surfaces together to hold the motor at a spaced inward distance from the internal surface of the shell to provide said annular passage, a fan mounted on one end of the motor, said fan having a nose-like hub with an outer surface substantially coinciding with the outer surface of the shell, said annular air passage having one end thereof blanked by the nose-like hub and having the other end open to atmosphere, and means to direct air through the annular air passage to cool the motor.

13. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an internal surface larger than the external surface of the motor to provide an annular air passage therebetween, said outwardly projecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, a duct arrangement disposed to receive fan-driven air from the outside of the hollow shell and conduct same to the annular air passage for cooling the motor, said duct arrangement being solely carried by the hollow shell.

14. In an axial flow fan structure comprising an electric motor having a shaft and a fan mounted thereon having a nose-like hub with radially extending blades, said motor having outwardly projecting mounting means extending therefrom, the improvement of a fan and motor housing comprising a cast structure having an outer annular wall and a centrally disposed hollow shell connected to the outer annular wall by a plurality of vanes, said hollow shell receiving the motor and having inwardly projecting abutment means against which the outwardly projecting mounting means of the motor abuts, said shell having an internal surface larger than the external surface of the motor to provide an annular air passage therebetween, said outwardly proecting mounting means and said inwardly projecting abutment means having radially overlapping abutting surfaces, means for fastening the outwardly projecting mounting means of the motor to the inwardly projecting abutment means of the shell for clamping the radially overlapping abutting surfaces together to hold the motor at a spaced inward distance from the internal surface of the shell to provide said annular air passage, a duct arrangement disposed to receive fan-driven air from the outside of the hollow shell and conduct same to the annular air passage for cooling the motor, said duct arrangement being solely carried by the hollow shell, said annular air passage having one end thereof blanked by the nose-like hub and having the other end open to atmosphere through the duct arrangement.

THEODOR H. TROLLER.
CHESTER P. JENKINS.